C. W. SPONSEL.
TYPE WRITING MACHINE.
APPLICATION FILED AUG. 18, 1905.
1,046,229.
Patented Dec. 3, 1912.
3 SHEETS—SHEET 1.
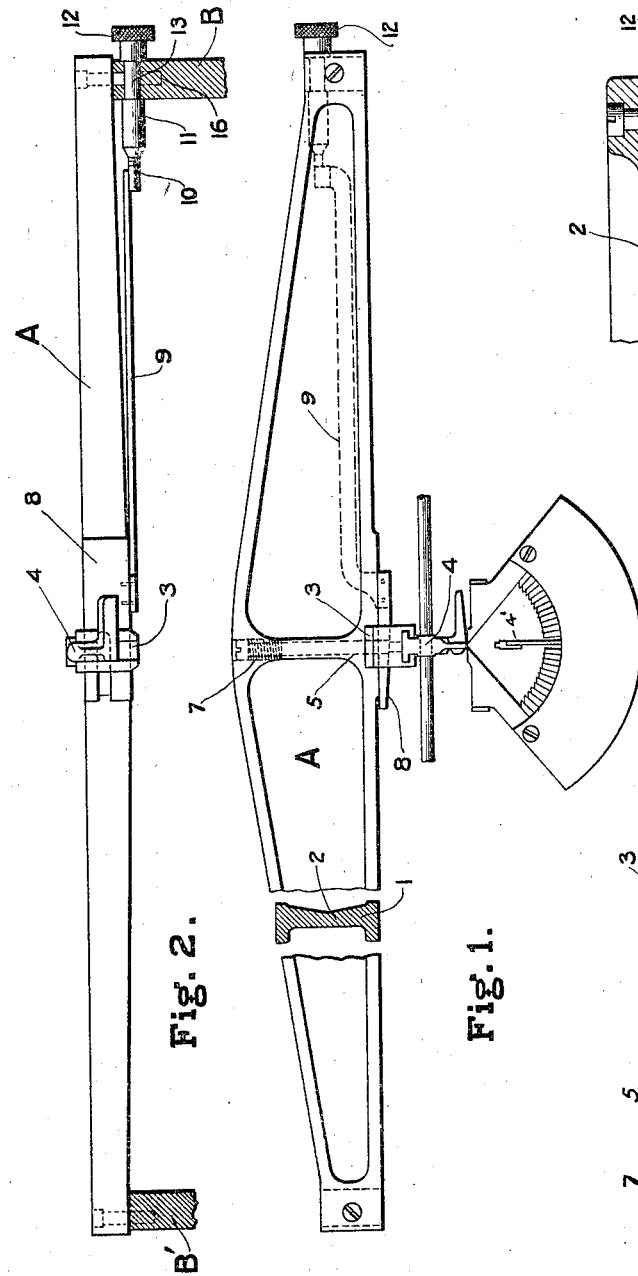
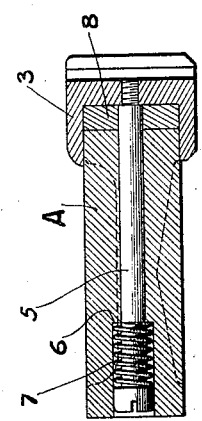
WITNESSES:
INVENTOR
C. W. Sponsel
BY
Warfield & Duell
ATTORNEYS

C. W. SPONSEL.
TYPE WRITING MACHINE.
APPLICATION FILED AUG. 18, 1905.

1,046,229.

Patented Dec. 3, 1912.

3 SHEETS—SHEET 3.

WITNESSES:

INVENTOR
C. W. Sponsel
BY
Warfield & Duell
ATTORNEYS

UNITED STATES PATENT OFFICE.

CHARLES W. SPONSEL, OF HARTFORD, CONNECTICUT, ASSIGNOR, BY MESNE ASSIGNMENTS, TO THE NOISELESS TYPEWRITER COMPANY, OF MIDDLETOWN, CONNECTICUT, A CORPORATION OF CONNECTICUT.

TYPE-WRITING MACHINE.

1,046,229.  Specification of Letters Patent.  Patented Dec. 3, 1912.

Application filed August 18, 1905. Serial No. 274,649.

*To all whom it may concern:*

Be it known that I, CHARLES W. SPONSEL, residing at Hartford, in the county of Hartford and State of Connecticut, have invented certain new and useful Improvements in Type-Writing Machines, of which the following is a full, clear, and exact description, such as will enable others skilled in the art to which it appertains to make and use the same.

This invention relates to typewriters and although capable of use in a variety of relations in many forms of machines is especially adapted for use in machines known as " silent typewriters."

One of its objects is to so construct the platen carrying means that the same will be absolutely unyielding under pressure of the printing devices.

Another object is to provide means adapted to adjust the platen toward or from the printing plane.

Other objects will be in part obvious and in part hereinafter pointed out.

The invention accordingly consists in the features of construction, combinations of elements and arrangement of parts which will be exemplified in the embodiments hereinafter described and the scope of the application of which will be indicated in the following claims.

Figure 5:
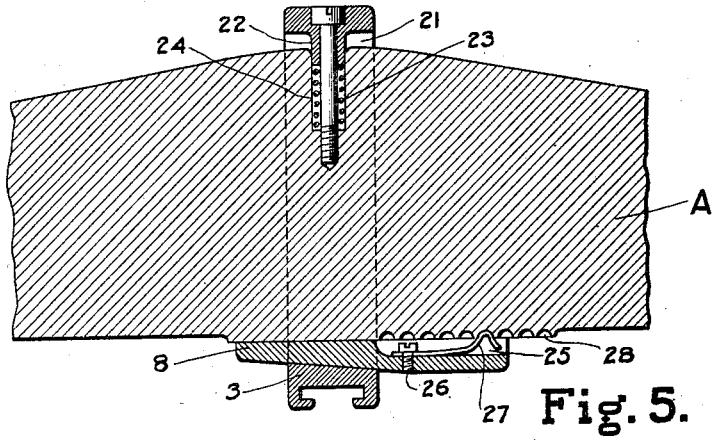
Figure 6:
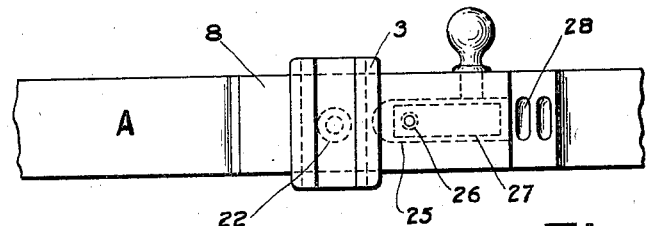
Figure 11:
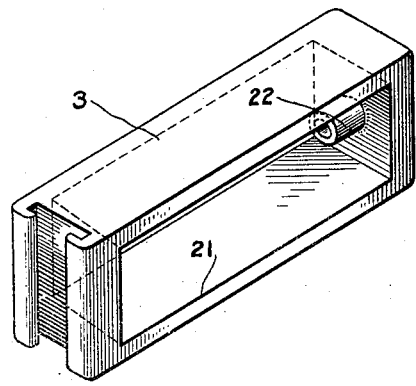
Figure 7:
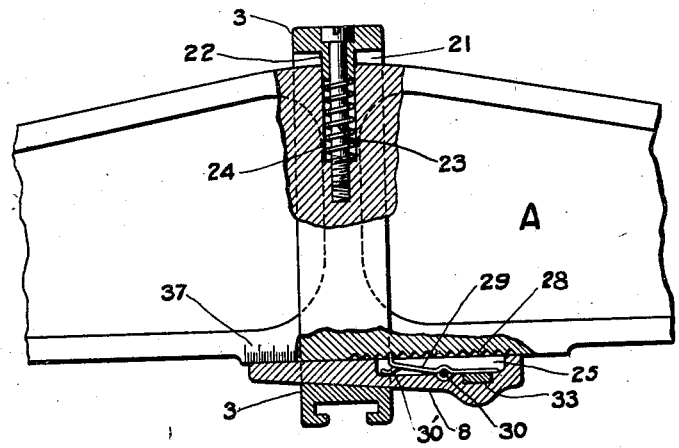
Figure 8:
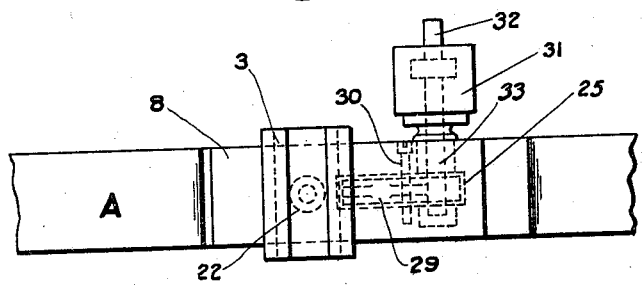
Figure 10:
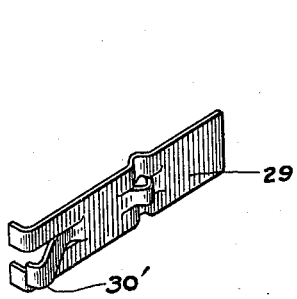
Figure 9:
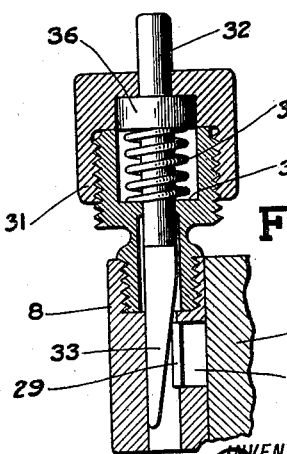

In the accompanying drawings wherein are illustrated several of various possible embodiments of my invention, Figure 1 is a top plan view of my preferred embodiment of the same. Fig. 2 is an elevation of certain parts shown in Fig. 1. Fig. 3 is a sectional view showing retaining means for the platen carrying head. Fig. 4 is a fragmentary view, partly in section, showing adjusting means for the platen. Fig. 5 is a fragmentary view partly in section showing a modified form of platen adjusting means. Fig. 6 is an elevation of the embodiment illustrated in Fig. 5. Fig. 7 is a fragmentary view partly in section of another modified form of the platen adjusting means. Fig. 8 is an elevation of the embodiment illustrated in Fig. 7. Figs. 9 and 10 are views showing details of construction of the embodiment illustrated in Figs. 9 and 10. Fig. 11 is a view in perspective of the platen carrying head employed in the embodiments illustrated in Figs. 5 to 10 inclusive.

Similar reference characters refer to similar parts throughout the several views of the drawings.

As tending to render better understood certain of the various general features of my invention, it may here be noted that in machines of this type, to which my invention is applied, particularly those wherein the impression on the paper is made by pressure and not by impact or concussion, it is of the utmost importance that the means employed to carry the platen be so constructed as to be immovable with respect to the printing plane during the moment of printing. It is, moreover, essential in machines of this character to have an unyielding impression surface, under pressure of the printing devices, and any movement of the platen or the platen supporting means results in an inferior grade of work. Such a defect is even more apparent in manifolding work, wherein the pressure exerted by the type bar must necessarily be great, and any movement whatever of the platen in a direction away from the printing plane not only greatly affects the quality of work, but materially diminishes the number of copies which otherwise could be made. It is also essential that the platen in machines of this type be so arranged as to be adjustable, in order that the type be brought into contact with the impression surface without concussion or impact and, therefore, substantially without noise, and, moreover, when a number of copies are made, as in manifolding, the combined thickness of the sheets employed, lessens to a marked degree, in machines of such type, the amount of leverage which can ordinarily be applied through the key levers to the type bars, by reason of the surface of the paper or other material extending without or beyond the normal printing plane. In such cases, therefore, I have found it desirable that mechanism be provided to allow an adjustment of the platen to a position slightly behind the normal printing plane, such position being largely determined by the thickness of the paper and the number of sheets employed, but in whatever position the platen be located, there should be means provided to maintain the platen in a rigid position during the moment of printing.

The above and other advantages are secured in constructions of the nature of that hereinafter described.

Referring now to the drawings, and particularly to Figs. 1 to 4, the truss A mounted upon upright bars B and B' forming part of the frame of the machine comprises a truss-shaped channel bar 1 having a greater width at the center than at its ends, and a thin web 2 to insure lightness, and at the same time to preserve stiffness and rigidity. By the term "truss," as herein used in the specification and claims I mean a member comprising a plurality of mutually supported parts and adapted to resist deflection upon the application of pressure intermediate thereof. The central portion of truss A carries a head 3 which projects at its upper and lower parts to accommodate truss A, as clearly shown in Fig. 3, the front portion of said head being tongued out to receive a platen 4. Pressure operated type carriers 4' having a limited length of travel, of that general style illustrated and described in patent to W. P. Kidder No. 630,060, August 1, 1899, are adapted to coact with the platen 4, as shown diagramatically in Fig. 1. To head 3 in the present instance is secured a screw 5 passing through truss A, and between the head of screw 5 and a shoulder 6 upon said truss, a spring 7 is interposed, which spring exerts a pressure against said screw head and holds an inclined face of head 3 against an oppositely inclined face of a wedge 8. Wedge 8 is adapted to be slid along truss A by means hereinafter to be described, such sliding movement operating to adjust the platen to or from the printing plane. It may here be noted that by the term "printing plane," as herein used in specification and claims I mean that point or position assumed by the type faces during the moment of printing, and by the term "moment of printing," I mean that particular point or period of time occupied by a printing device during the operation of impressing or imprinting a character upon an impression surface. Wedge 8 is provided with a longitudinal slot to accommodate screw 5 and attached to said wedge is a rod 9 carrying at its opposite end an adjusting screw 10 co-acting with an adjusting nut 11 having a milled head 12 fastened to stem 13 of said nut, which stem is journaled in upright B of the frame of the machine. In order to maintain nut 11 in adjusted position, a friction piece 14 is provided, which is adapted to engage stem 13 of nut 11 and is held in such engagement by extensile spring 15 located in a depression 16 in upright B.

The operation of the above described embodiment, which should be largely obvious from the description thereof is substantially as follows: Should it be desired to adjust the platen toward or from the normal printing plane, a rotation of milled adjusting nut 11 will, through rod 9, cause wedge 8 to slide along truss A, the inclined face thereof causing an outward movement of head 3 or allowing a receding movement, the direction of such movement, of course, depending upon the direction of movement of said wedge, spring 7 operating to maintain head 3 in constant engagement therewith. It will thus be seen that a very finely graduated and easily operated adjustment of the platen is secured, friction piece 14 engaging stem 13 of nut 11 operating to maintain the parts in adjustment.

In Figs. 5 to 11 there is shown another embodiment of certain features of my invention in which head 3 is hollowed out at 21 to inclose or straddle the central portion of truss A and is provided with an inwardly extending projection 22, against which spring 23 seated in depression 24 of truss A presses to hold the inner face of head 3 in engagement with the oppositely disposed face of wedge 8. In the construction shown in Figs. 5 and 6 there is fastened to the wall of a recess 25 in the base of wedge 8 by suitable means, as screw 26, a leaf spring 27, the end of which is adapted to engage with a series of depressions 28 in truss A.

The construction shown in Figs. 7 to 10 differs slightly from that next above described, in that I have provided a spring detent 29 pivoted to a pin 30 extending transversely of recess 25 located in the base of wedge 8. Detent 29 is adapted to engage with any one of depressions 28 of truss A and is held in such engagement by an integral spring 30' contacting with a wall of recess 25. Wedge 8 is, in this instance, provided with a knob or handle 31 by which wedge 8 may be slid along truss A and located in said knob or handle is a pusher pin 32, provided at the lower end thereof with a cam or wedge 33 adapted to engage with the free end of detent 29. Spring 34 resting on a shoulder 35 of knob or handle 31 and exerting tension on shoulder 36 of pusher pin 32, maintains the same in its upward position. If desired, a scale 37 may be provided on truss A, to co-act with the end of wedge 8, or a suitable device thereon, to indicate the position of the platen with respect to the normal printing plane.

It will be readily seen that in the embodiment shown in Figs. 5 and 6, wedge 8 may be slid along truss A, leaf spring 27 operating to maintain the same in any desired position, such position being automatically determined by the engagement of said spring with any one of depressions 24.

The method of use of the embodiment shown in Figs. 7 to 10 should be largely obvious from the above description thereof, taken in connection with the description of the operation of that next above described. Pusher pin 32, upon the application of pressure, will cause cam 33 to disengage detent 29 from depressions 28, allowing wedge 8 to be slid along truss A to secure the desired adjustment of the platen.

It will accordingly be seen that I have devised a mechanism well adapted to attain the objects of my invention and one which is also characterized by simplicity and efficiency. By the provision for the adjusting means for the platen a uniform pressure of the printing devices against the impression surface may at all times be secured and the manifold advantages obtained by the employment of the truss are inherent in all of the embodiments herein shown and described.

While I have shown and described my invention as applied to a machine of the above type, I do not wish to be understood as limiting myself exclusively to such type, nor, in fact, to any form of typewriting machine, as it is equally adapted as to many of its features for use in a variety of relations in machines of other types, although of peculiar value in the relation shown.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent, is:—

1. In a typewriting machine, in combination, a truss, a platen carried thereby, and a movable wedge sliding on said truss and interposed between the truss and the platen adapted to adjust the platen toward or from the printing plane.

2. In a typewriting machine, in combination, a truss, a platen, a wedge sliding on said truss and interposed between the truss and the platen adapted to adjust the platen toward or from the printing plane, and means for sliding said wedge along said truss.

3. In a typewriting machine, in combination, a truss, a platen, a wedge sliding on the truss and interposed between the truss and the platen adapted to adjust the platen toward or from the printing devices, means for sliding said wedge along the truss, and means for holding said wedge in an adjusted position thereon.

4. In a typewriting machine, in combination, a truss, a platen, movable means positioned upon the truss adapted to carry the platen, a wedge sliding upon the truss and engaging said means and adapted to cause a movement of the same toward or from the printing plane, means for causing a sliding movement of the wedge, and means for holding said second-mentioned means in a stationary position after a movement thereof.

5. In a typewriting machine, in combination, a truss, a head mounted thereon, a platen carried by the head, and means sliding upon the truss and engaging said head for adjusting the same to cause the platen to approach or recede from the printing plane.

6. In a typewriting machine, in combination, a truss, a head mounted thereon, a platen carried by the head, and a wedge sliding on the truss and engaging the head and adapted to cause a movement of the platen toward or from the printing plane.

7. In a typewriting machine, in combination, a truss, a movable head mounted thereon, a platen carried by said head, a wedge sliding on the truss and engaging the head to cause a movement thereof to adjust the platen toward or from the printing plane, and means for holding the head in engagement with said wedge.

8. In a typewriting machine, in combination, a truss, a head carried thereby, a wedge sliding on the truss and engaging the head to cause a movement thereof to adjust the platen toward or from the printing plane, and means for automatically holding the head in engagement with said wedge.

9. In a typewriting machine, in combination, a truss, a movable head mounted thereon, a platen carried by said head, a wedge sliding on the truss engaging the head and adapted to cause a movement thereof to adjust the platen toward or from the printing plane, and a spring for holding the head in engagement with said wedge.

10. In a typewriting machine, in combination, a truss, a movable head positioned thereon, a platen carried by the head, a wedge sliding on the truss and engaging the head and adapted to adjust the same with respect to the printing plane, means upon the head extending through the truss, and a spring engaging said means and adapted to exert a pressure thereon to maintain said head in engagement with said wedge.

11. In a typewriting machine, in combination, a truss, a movable head positioned thereon, a platen carried by the head, a wedge sliding on the truss and engaging the head and adapted to cause a movement thereof and a corresponding movement of the platen with respect to the printing plane, and means adapted to prevent a receding movement of said wedge under the pressure of the printing devices during the moment of printing.

12. In a typewriting machine, in combination, a truss, a movable head positioned thereon, a platen carried by the head, a wedge sliding on the truss and engaging the head and adapted to cause a movement thereof and a corresponding movement of the platen with respect to the printing plane, a screw secured to said head and extending through the truss, and a spring encircling said screw and engaging the head thereof to maintain said first-mentioned head in engagement with said wedge.

13. In a typewriting machine, in combination, a truss, a movable head mounted thereon, a platen mounted upon the head, a wedge sliding on the truss and engaging the head, a rod secured to said wedge, and means for projecting said rod along the truss to cause a corresponding movement of said wedge to adjust the platen with respect to the printing plane.

14. In a typewriting machine, in combination, a relatively fixed abutment, a head mounted thereon, a paper carrier mounted on said head, a type carrier having a limited length of travel toward said paper carrier, a movable member between said head and said abutment, and means for moving said member to cause a corresponding movement of the head and paper carrier toward or from the end of the path of travel of said type carrier.

15. In a typewriting machine, in combination, a truss, a movable head mounted thereon, a wedge sliding on the truss and engaging the head, a rod secured to said wedge, a screw mounted upon said rod, a nut operating upon the screw and adapted to cause a longitudinal movement thereof, said movement being communicated through said rod to said wedge to cause a movement of the platen toward or from the printing plane, and means for preventing a receding movement of the wedge under pressure of the printing devices.

16. In a typewriting machine, in combination, a truss, a movable head mounted thereon, a platen mounted upon the head, a wedge sliding on the truss and engaging the head, a rod secured to said wedge, a screw mounted upon said rod, a nut engaging said screw and adapted to cause a longitudinal movement thereof, said movement being communicated through said rod to said wedge, and means acting upon said nut to frictionally maintain the same in adjustment.

17. In a typewriting machine, in combination, a truss, a movable head mounted thereon, a platen carried by the head, a wedge sliding on the truss and interposed between the same and said head, an adjusting rod secured to said wedge, a screw mounted upon said rod, a nut journaled in the frame of the machine and co-acting with said screw to cause a longitudinal movement thereof, said movement being communicated through said rod to said wedge to adjust the platen with respect to the printing plane, and spring-actuated frictional means acting on said nut to maintain the same in an adjusted position.

18. In a typewriting machine, in combination, a truss, a channeled head mounted thereon, said channeled movable head being provided wit an inclined face, a platen carried by said head, a wedge provided with an oppositely inclined face interposed between said truss and said head and adapted to engage the inclined face of said head, said wedge being adapted by a longitudinal movement thereof to adjust the platen with respect to the printing plane, means carried by the head co-acting with the truss to maintain a constant engagement between said head and said wedge, means for causing a longitudinal movement of the wedge along the truss, and means for holding said last-mentioned means in a stationary position after such movement.

19. In a typewriting machine, in combination, a truss, a movable head provided with an inclined face mounted thereon, a platen carried by the head, a wedge provided with an oppositely inclined face sliding on the truss and interposed between the same and said head, the inclined face of said wedge being in contact with the inclined face of said head, and means for causing a relative movement between the wedge and said head to adjust the platen with respect to the printing plane.

20. In a typewriting machine, in combination, a truss, a channeled head having an inclined face movably mounted thereon, a platen carried by the head, a wedge having an oppositely inclined face adapted to slide on said truss, the inclined face thereof being in engagement with the inclined face of said head, means for causing a longitudinal movement of said wedge along said truss to compel an outward movement of said head and the platen carried thereby, said means also being adapted to move said wedge in a different longitudinal direction to permit a movement of said head and the platen carried thereby in an opposite direction, and means for maintaining said head in constant engagement with said wedge.

21. In a typewriting machine, in combination, a platen, a fixed abutment, one of said parts having an inclined surface, and a movable wedge member interposed between said parts for adjusting the relative positions of the platen with respect to the type.

22. In a typewriting machine, in combination, a platen, type carriers adapted to coact therewith, positively acting means adapted to adjust said platen toward said type carriers, a rigid abutment behind said platen; and resilient means tending to urge said platen in the opposite direction and against said rigid abutment.

23. In a typewriting machine, in combination, a platen carriage, a platen carried thereby, end plates associated therewith, and a truss rigidly secured to said end plates positioned behind said platen adapted to take up the strains exerted by the action of the type-carriers.

24. In a typewriting machine, in combination, a platen carriage, a platen carried thereby, type-carriers adapted to coact with said platen, end plates associated therewith, and a truss mounted on said end plates behind said platen, said truss adapted to resist strains exerted in both horizontal and vertical planes.

25. In a typewriting machine, in combination, a rigid abutment secured to the frame of the machine, type-carriers having a limited path of travel terminating in a normal printing plane, a platen with which said type-carriers are adapted to coact in front of said abutment, and means intermediate said abutment and said platen for moving the platen relatively to the normal printing plane.

In testimony whereof I affix my signature, in the presence of two witnesses.

C. W. SPONSEL.

Witnesses:
 W. H. HONISS,
 NELLIE PHOENIX.

---

Copies of this patent may be obtained for five cents each, by addressing the "Commissioner of Patents, Washington, D. C."